UNITED STATES PATENT OFFICE.

GEORGE C. LEWIS, OF WASHINGTON, DISTRICT OF COLUMBIA.

IMPROVEMENT IN THE PREPARATION OF PHOTOGRAPHS FOR THE RECEPTION OF COLORS.

Specification forming part of Letters Patent No. 176,653, dated April 25, 1876; application filed September 9, 1875.

*To all whom it may concern:*

Be it known that I, GEORGE C. LEWIS, of Washington, in the District of Columbia, have invented certain new and useful Improvements in Finishing Pictures termed "Chromotypes," of which the following is a specification:

This invention relates to certain improvements in finishing the surfaces of photographic pictures, its object being to produce upon the surfaces of the ordinary positive pictures taken directly in the camera a coating which can be finished up in crayons or water-colors with the same facilities as the surfaces of the ordinary positive prints produced from a negative picture, and which will serve, also, as a protecting substance to the thin collodion film and the various portions of the picture which it sustains.

The invention consists in an improved method of producing upon the surfaces of such pictures an adhesive coating of such nature as to readily receive the coloring matter, and of sufficient strength to withstand the rubbing of the crayons and form a protecting covering to the picture, by applying to the same a coating of any soluble gum or gelatinous material, in combination with honey or other similar hygroscopic material, and allowing the same to dry, as fully hereinafter described.

In carrying out my invention I take gum-arabic, dextrine, gelatine, or other similar substance, and combine it with honey, grape-sugar, glycerine, or other similar hygroscopic substance. In practice I find a solution of gum-arabic and honey to answer admirably.

These substances I use in equal proportions, with or without the addition of water, according to the thickness and strength of the required coating. I apply the compound to the plate after fixing and washing, flowing it over the surface until the whole is evenly covered, after which I dry the whole by natural or artificial heat.

The surface thus produced upon the plate will be extremely adhesive, and will have sufficient strength to sustain the coloring matter and the rubbing necessary to apply the same. The gum forms the ground or base of the coating or surface, while the honey or hygroscopic material effectually prevents any tendency of the gum to crack or chip off.

The finished pictures formed by my improved process I term "chromotypes," to distinguish them from other photographic pictures.

Having thus described my invention, what I claim, and desire to secure by Letters Patent, is—

The process herein described of preparing the surfaces of photographic pictures for the reception of coloring material by applying to the same a coating of gummy or gelatinous substance combined with honey or other hygroscopic material, substantially as set forth.

In testimony that I claim the foregoing I have hereunto set my hand in the presence of the subscribing witnesses.

GEO. C. LEWIS.

Witnesses:
JAMES L. NORRIS,
JOS. L. COOMBS.